(12) United States Patent
Giangrande

(10) Patent No.: US 9,108,570 B2
(45) Date of Patent: Aug. 18, 2015

(54) MOTOR VEHICLE COASTING CAUTION LIGHT

(76) Inventor: Ercole Giangrande, Westbury, NY (US)

( * ) Notice: Subject to any disclaimer, the term of this patent is extended or adjusted under 35 U.S.C. 154(b) by 569 days.

(21) Appl. No.: 13/179,953

(22) Filed: Jul. 11, 2011

(65) Prior Publication Data
US 2012/0013459 A1    Jan. 19, 2012

Related U.S. Application Data

(60) Provisional application No. 61/363,670, filed on Jul. 13, 2010.

(51) Int. Cl.
*B60Q 1/26* (2006.01)
*B60Q 1/44* (2006.01)

(52) U.S. Cl.
CPC ........................................ *B60Q 1/44* (2013.01)

(58) Field of Classification Search
USPC .......... 340/468, 467, 463, 471, 464, 435, 436
See application file for complete search history.

(56) References Cited

U.S. PATENT DOCUMENTS

| | | | |
|---|---|---|---|
| 4,823,109 A * | 4/1989 | Boyer ............................ | 340/467 |
| 5,309,141 A * | 5/1994 | Mason et al. ................. | 340/467 |
| 5,376,918 A * | 12/1994 | Vinciguerra et al. ......... | 340/479 |
| 5,486,808 A | 1/1996 | Nejdl | |
| 5,663,706 A | 9/1997 | Francis | |
| 6,014,601 A * | 1/2000 | Gustafson ...................... | 701/45 |
| 6,335,681 B1 | 1/2002 | Ontiveros | |
| 6,359,552 B1 * | 3/2002 | King ............................ | 340/436 |
| 6,424,256 B1 * | 7/2002 | Ryder .......................... | 340/479 |
| 6,486,774 B1 * | 11/2002 | Arnold, Sr. ................... | 340/467 |
| 7,077,549 B1 | 7/2006 | Corliss | |
| 7,468,681 B2 * | 12/2008 | Bootes ......................... | 340/984 |
| 2002/0135470 A1 * | 9/2002 | Campagna .................... | 340/436 |
| 2007/0159318 A1 * | 7/2007 | Roser ........................... | 340/467 |
| 2010/0117818 A1 * | 5/2010 | Kao ............................. | 340/467 |

* cited by examiner

*Primary Examiner* — Hung T. Nguyen
(74) *Attorney, Agent, or Firm* — Daniel Boudwin; Global Intellectual Property Agency LLC

(57) ABSTRACT

A rearwardly facing vehicle warning system for alerting nearby motorists of a coasting condition on a highway or similar high speed road. The system comprises a light source placed in the rear of a vehicle that illuminates when a motorist is neither applying pressure to the accelerator pedal or the brake pedal. A single light, illuminated in a color other than preexisting vehicle tail light colors, receives communication from an electric circuit or onboard computer that is communicating with a sensor monitoring both the accelerator and brake pedal. When neither is being utilized, the light is illuminated to warn motorists that the vehicle is undergoing a coasting condition and may be decelerating. The system provides notice of vehicle coasting to prevent unnecessary vehicle collisions from the rear due to an un-indicated change in vehicle speed, which may result from failing to maintain speed through constant pressure on the accelerator pedal.

6 Claims, 2 Drawing Sheets

MOTOR VEHICLE COASTING CAUTION LIGHT

CROSS REFERENCE TO RELATED APPLICATION

This application claims the benefit of U.S. Provisional Application No. 61/363,670 filed on Jul. 13, 2010, entitled "Caution Light."

BACKGROUND OF THE INVENTION

1. Field of the Invention

The present invention relates to vehicle warning systems and indicators. More specifically, the present invention pertains to a rearwardly facing warning system for motorist to indicate a condition of coasting, particularly at high speeds and in congested areas. Coasting is defined as neither depressing the accelerator pedal nor applying the brakes to change speed, which is currently an unregulated and unsignaled change in vehicle condition that creates hazards for nearby motorists.

2. Description of the Prior Art

Traffic accidents, and in particular rear end collisions, are a common occurrence in today's busy roadways. This is particularly true along high speed roads, highways and freeways in congested regions. The ability of a driver to observe a change in momentum of a car or line of cars in front of the user's own, realize an impending collision and react accordingly requires quick reflexes and timing. Traditional brake light warning systems provide a notice of deceleration caused by application of the brake pedal only, and not an indication of any further vehicle state. The vehicle may be accelerating, cruising or coasting without any notice to outside drivers, which requires the user to anticipate and compensate for changes in momentum based on visual reference and depth perception. Those with an understanding of vehicle dynamics may be more inclined to provide adequate spacing in the event of such occurrences, while others may react based on instinct. Deceleration warning is only provided when the user depresses the brake pedal, which may be too late for those drivers providing little room to react and who did not realize the traffic is in a coasting state or decelerating without braking. Situations like these lead to collisions or near collisions on a daily basis.

Compounding the issue of inadequate warning systems, motorists are very distracted in today's driving world. In-car peripherals, handheld devices and a multi-tasking while driving take attention away from the current task at hand, which is safety navigating a vehicle in the presence of other drivers and roadway obstacles. Drivers are often distracted to the point they are not paying attention to roadway conditions or changes in vehicle speed further down the road from the immediate vehicle in front of their vehicle. This leaves very little time to react, and an impaired ability to compensate for any rapid deceleration.

The sheer size of vehicles and variety thereof also presents a similar problem, as vision beyond the immediate car in front of a driver may not be available if blocked by a large or oversized vehicle. Along a congested highway, wherein a line of motorists are sometime traveling at a high rate of speed at relatively close proximity to one another compared to their velocity and stopping ability, a driver is required to look an adequate distance in front of the vehicle immediately ahead of their vehicle to anticipate changes in traffic flow. Vehicle size, driver distraction and roadway congestion are all factors that contribute to a high frequency of traffic collisions between motorists, particularly in high speed situations and in highly populated areas.

Brake warning lights are mandatory systems on a vehicle, and provide an indication to motorists in the rear of the vehicle of a depression of the brake pedal and an impending deceleration. This provides a motorist with the ability to anticipate a vehicle reducing its speed based on application of the brakes, but not if the driver is coasting or between application of accelerator and brake pedal. No preemptive warning system is currently available that alerts drivers that traffic is not maintaining speed or is coasting in anticipation of a braking event. Lapses in concentration can result in being unaware of this subtle change in forward momentum until full application of the brakes is warranted, which places the driver at risk for colliding with forward vehicles, and likewise being crashed into from behind from motorists not expecting such a drastic change in momentum. The ability to anticipate a change in momentum and to provide notice and transition from constant momentum to a deceleration is needed to improve roadway safety and reduce traffic collisions. Unannounced transitions in momentum are noted only be the brake lights, changes in the vehicle suspension and a rapid approach to the rear of the forward vehicle. If forewarned of a possible change in speed, drivers can take the necessary precautions to coast or apply the brakes earlier in a situation, reducing the changes of a collision.

Several devices have been described in the prior art for notifying and warning motorists of a vehicle momentum state, including coasting and the use of driver assistants such as cruise control. These devices lack a rear facing light that illuminates when the vehicle is in a coasting state and one that is colored different from standard red brake lights. The present invention contemplates integration of the coasting warning lights or optionally placing a light along the rear of the vehicle to warn other motorists. The lights are ideally suited for highway driving and in regions of high congestions, where closely followed traffic and high speeds result in a requirement for heightened awareness of a vehicle's momentum state.

U.S. Pat. No. 7,077,549 to Corliss describes a vehicle warning light system that employs sensors associated with the brake and accelerator pedals to create a warning system along the front and rear of a motor vehicle, indicating a variety of different events and combinations of accelerator and brake pedal depression. Changes in vehicle momentum are captured through a visual or other communication system, allowing improved response time for following vehicles. While this patent describes a device similar to the present invention, little attention is given to the structure of the lights in combination with standard lights, particularly their color and placement so as not to confuse or interfere with standard vehicle lights. Further, the Corliss patent requires front and rear lights to warn motorists, whereas the present invention describes a system that only incorporates a rear-facing warning light and a system for monitoring the state of the brake and accelerator pedals.

U.S. Pat. No. 5,663,706 to Francis describes a similar invention wherein a rear end collision warning system provides a warning light to nearby motorist as to a change in vehicle state, particularly when the user transitions from the accelerator to the brake pedal. When both are released, a transition warning light is illuminated to provide warning to motorists in the rear. The warning light comprises a rear facing flasher device, as opposed to a solid lamp or indicator. The system provides the warning only when the vehicle is in a drivable state, the brake pedal is not depressed, the accelerator is not depressed, and finally when the cruise control is not active. This system provides an actively flashing lamp to following motorists, which can be distracting and take away from the intended purpose of the present invention. This device would induce a panic and unnecessary braking from motorists, which may exacerbate the rear end collision problem along congested and high speed roadways.

U.S. Pat. No. 5,486,808 Nejdl describes a kit for a motor vehicle for indicating utilization of cruise control. The device comprises a light with a warning message that illuminates when cruise control is engaged, warning nearby motorists of the vehicle's constant velocity. U.S. Pat. No. 6,335,681 to Ontiveros describes a cruise control warning system similar to the Nejdl patent, wherein a visual warning system is provided for nearby motorists, mounted on the vehicle and indicating both the use of the cruise control and the chosen speed. A voice chip is also provided to alert the operator of the vehicle of the set cruise control speed to prevent speeding. These devices provide notice to motorists that a vehicle is utilizing cruise control. While they are adapted to suit their respective requirements and fulfill a role, the use of cruise control does not guarantee a vehicle is not accelerating or decelerating. Current vehicles provide control of the cruise control to the extent a driver may update speed based on acceleration or deceleration requests. When decelerating, the vehicle may be placed into a coasting position, which places motorists behind the current vehicles at risk. The use of sign indicating cruise control would then be misleading and result in a motorist assuming the vehicle is operating at a constant momentum when it may in fact be changing to suit the given driver's input.

The present invention provides a motorist with a means to indicate changes in momentum based on driver brake pedal and accelerator pedal input, and one that does not overly distract other motorist or prompt other motorist to react in a way to worsen a situation, i.e. depressing their brakes abruptly when not required. The device is suited for highway and freeway speeds and in congested areas, where vehicles are traveling in close proximity. The amount of rear end collisions and multicar accidents in these driving conditions necessitates a device of this type to fulfill a clear need in the art. It substantially diverges in design elements from the prior art and consequently it is clear that there is a need for an improved vehicle visual warning device. In this regard the instant invention substantially fulfills these needs.

SUMMARY OF THE INVENTION

In view of the foregoing disadvantages inherent in the known types of vehicle warning systems now present in the prior art, the present invention provides a new vehicle warning system wherein the same can be utilized for providing convenience for the user when alerting following motorist of a change in a vehicle's condition with regards to forward momentum.

It is therefore an object of the present invention to provide a new and improved vehicle warning system device that has all of the advantages of the prior art and none of the disadvantages.

It is therefore an object of the present invention to provide a rear facing warning light to indicate to following motorists a change in the vehicle's momentum condition, wherein the driver is neither depressing the accelerator or the brake and is currently in a coasting state. This state, depending on the vehicle and grade of the road, indicates the car may be reducing speed or coasting in anticipation of application of the brakes. The goal is to alert following motorists of a possible braking situation in a high speed, congested environment where quick reaction to changes in traffic speed are necessary.

Another object of the present invention is to provide a vehicle system that utilizes a plurality of sensors to monitor the state of a vehicle brake pedal, accelerator pedal, cruise control system and vehicle speed to determine a coasting condition.

Yet another object of the present invention is to provide a rear facing illumination means that operates based on input from the vehicle monitoring system. The illumination means may be any size, shape or color so as not to distract following motorists, cause confusion with regard to brake lights or the coasting light intentions, and one that may be conformed to any vehicle and made a standard safety feature in future vehicles.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
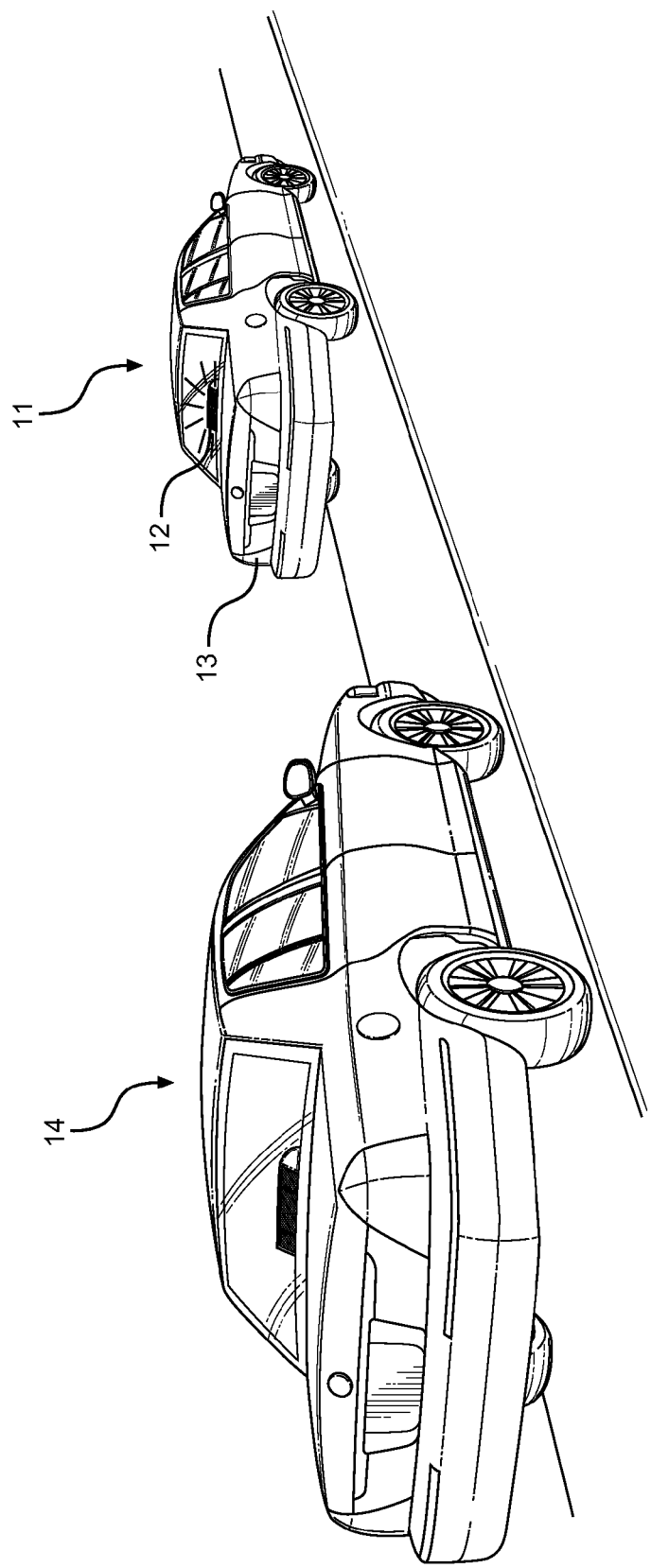
FIG. 1 shows a view of the present invention in a working position, wherein a forward vehicle is in a coasting state and a coasting light means is illuminated to warn a following vehicle.

Referring now to FIG. 1, there is shown a view of the present invention in a working position. A forward vehicle 11 mounted with the present invention provides warning to following motorists 14 of a change in the vehicles momentum state. More specifically, a rear facing caution light 12 assembly is provided on the vehicle 11, along with the standard set of brake, hazard, fog and reverse lights 13. The caution light 12 is a light that illuminates when the vehicle is not accelerating, maintaining current speed or braking. The light 12 is connected to and receives communication from a plurality of electronic devices that monitor the state of the accelerator pedal, the brake pedal, the parking brake, the gear position of the vehicle, the cruise control system and finally the speed of the vehicle. The light 12 is illuminated under a condition when the vehicle 11 is in a coasting state, wherein its forward momentum is no longer being maintained through release of the accelerator and the brake pedal, and when the cruise control is inactive. If the vehicle speed sensor determines the vehicle speed is not being maintained, the caution light instantaneously illuminates 12 to warn following vehicles 14 that the vehicle 11 is decelerating but not braking.

The conditions for illumination of the caution light 12 are preferably the following: 1) the vehicle is in drive for an automatic transmission and the parking brake is released; 2) the brake pedal is not depressed; 3) the accelerator pedal is not depressed; 4) the cruise control system is not active; and finally, 5) the vehicle speed sensor realizes a drop or plateau in vehicle speed (i.e. constant speed or deceleration).

The final condition prevents the system from illuminating when the first four conditions are met and the vehicle is still accelerating, for instance when the vehicle is travelling down a hill or in a similar situation wherein the vehicle momentum is increasing and a coasting warning 12 is not appropriate. Once these conditions are no longer met, the light is switched off, until a further coasting state is encountered. The goal is to warn other motorists of a possible change in a vehicle's momentum, and more specifically to a reduction in speed or a transition in vehicle state, such as an impending application of the brake pedal. The caution light 12 provides notice to motorists that a braking event may be forthcoming, which is particularly useful in congested, high speed traffic areas wherein vehicles are traveling closely to one another and in a high speed manner. This type of driving environment can reduce allowable reaction time for a motorist to adjust speed and minimizes the margin of error for application of brakes to prevent a collision. A caution light as disclosed herein may be used to indicate a change in traffic patterns and a possible reduction in speed in the traffic ahead of a vehicle.

Although not required, it may be preferred to incorporate a minimum speed for which the caution light 12 and system is operable. This prevents the light 12 from illuminating when a vehicle is not traveling at a high rate of speed, for instance when traveling through town or in low speed situations wherein a coasting warning system may not be very useful, and may further serve to confuse other motorists. The primary utility for the present invention is on highway and freeways, wherein traffic is clustered in close proximity and changes in a vehicle's speed affect many successive cars. A coasting warning system and a system that prepares a series of motorists of an impending change in highway speed or an upcoming braking event may serve to prevent rear end collisions and multicar pile ups in these environments.

Figure 2:
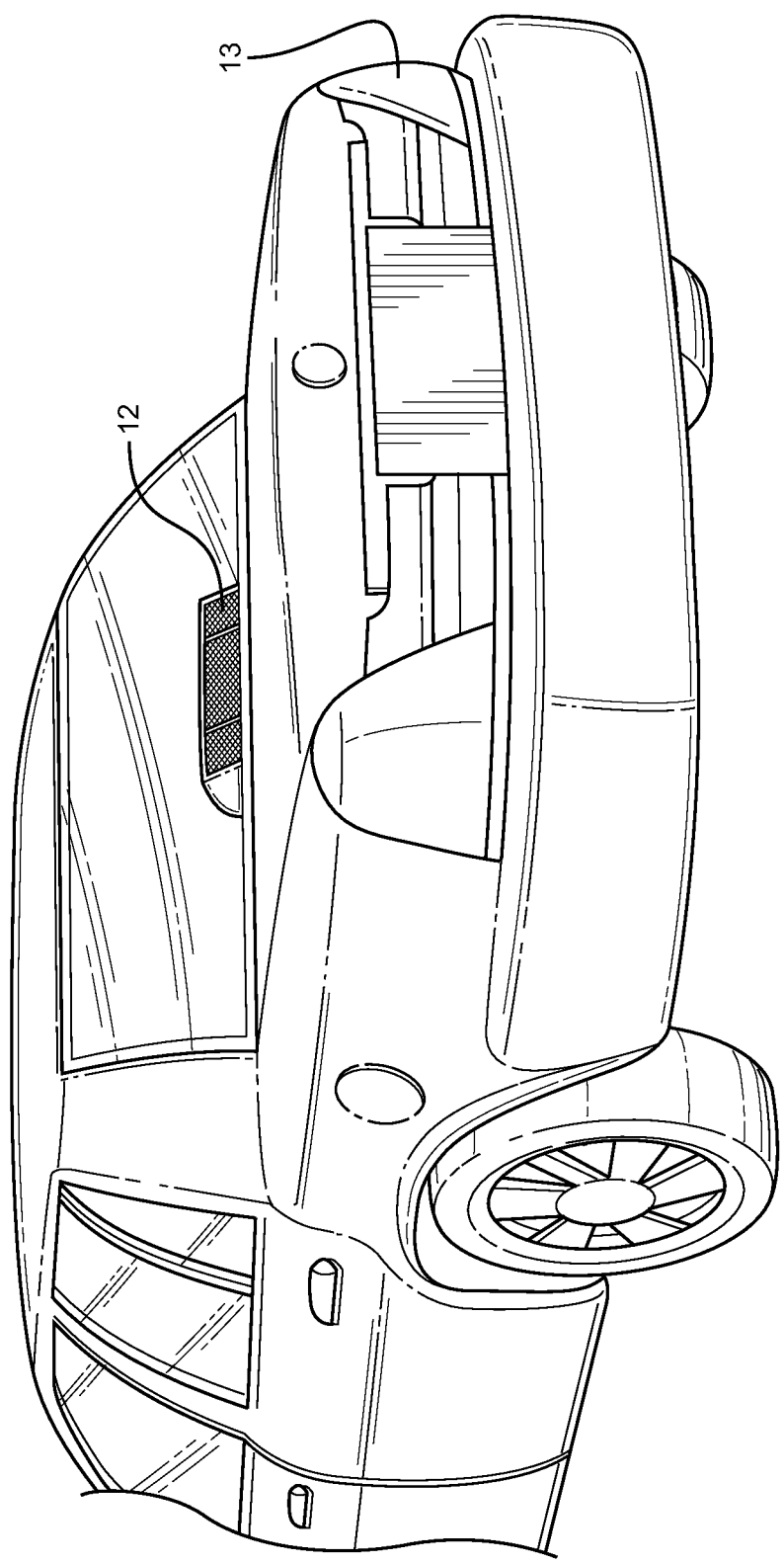
FIG. 2 shows a typical installation and position on a vehicle that may provide an adequate coasting warning to following motorists.

Referring now to FIG. 2, there is shown a view of a possible mounting location for the caution light 12 assembly, which is ideally mounted higher than standard brake lights 13 for rearward projection and ample vision for following motorists. The light 12 may further be incorporated into the existing tail lights, be placed along the trunk or in any other suitable position deemed visually effective by a vehicle manufacturer. While the caution light assembly illuminates given the aforementioned conditions, the style of the lamp may differ from the tail lights to provide differentiation thereof. It is required to have these lights illuminate in a different color than standard brake light red, otherwise the caution light 12 would cause confusion as to the state of the vehicle. The caution lights 12 may illuminate an amber, orange, blue, green or any other suitable color that provides a coasting warning without being confused for a depression of the brake pedal. It is counter to the spirit of the invention to startle motorists and prompt unnecessarily application of the brakes, which could potentially cause more problems for motorists therebehind and exacerbate the aforementioned problems at highway speed.

In an alternative embodiment, it may be preferred to include a time delay once the conditions are met prior to illuminating the light. The time delay will provide a pause once the conditions are met before the caution light is activated, which prevents overuse or flashing of the caution light in certain situations. A timing circuit or similar electronic means or logic may be included to accomplish the time delay, while the duration of the delay may be any time period deemed suitable by the vehicle manufacturer or user. The coasting condition must be maintained during the time delay in order for the light to illuminate. If the conditions are no longer met, the timer is reset until a further coasting state is determined.

The means utilized to operate the present invention may be any suitable electronic devices deemed appropriate by one skilled in the art of electronics or vehicle electrical systems. Communication is required between multiple systems, and internal circuit logic or microprocessor control determines the state of the caution light 12 with respect to the various input conditions stated above. It is not desired to limit the present invention to a set of electronics, but to disclose a device that operates based on a set of vehicle conditions and reports a coasting state to following motorists, particularly at high speeds wherein reaction time is very important for avoiding collisions due to changes in traffic speed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle caution light for alerting following motorists of a coasting vehicle condition, comprising:
   a rear-facing light assembly adapted to be mounted on a vehicle;
   said light assembly illuminates to provide notice to following motorists of a coasting state of said vehicle;
   said coasting state determined when said vehicle state is as follows:
      said vehicle transmission is in drive for a vehicle with an automatic transmission,
      said vehicle brake pedal is not depressed,
      said vehicle accelerator is not depressed,
      said vehicle cruise control is not active, and
      said vehicle speed is not increasing;
   said light assembly is operable only above a preset vehicle speed minimum, in order to prevent illumination at low speeds.

2. A device as in claim 1, wherein said vehicle state is determined via a plurality of electronic inputs to a central electronic circuit, which controls said light assembly illumination based on said inputs.

3. A device as in claim 1, wherein said vehicle speed is monitored by a vehicle speed sensor, which is used as input when said vehicle speed is constant or decreasing in speed, noting a coasting state of said vehicle when not traveling down an incline.

4. A device as in claim 1, wherein said light assembly illuminates in a color other than that of standard brake light red.

5. A device as in claim 1, wherein said light assembly is mounted above brake lights on said vehicle to provide improved vision for following motorists and reduce confusion with said brake light illumination.

6. A device as in claim 1, further comprising a time delay after said coasting state is determined that prevents said light assembly from illuminating for a set period of time;

said coasting state must be maintained during said time delay in order for said light assembly to illuminate.

* * * * *